(12) United States Patent
Bretschneider

(10) Patent No.: US 8,583,278 B2
(45) Date of Patent: Nov. 12, 2013

(54) METHOD AND DEVICE FOR PROCESSING OBJECTS WITH A TEMPORARY STORAGE DEVICE AND SORTING SYSTEM

(75) Inventor: Peter Bretschneider, Birkenwerder (DE)

(73) Assignee: Siemens Aktiengesellschaft, Munich (DE)

( * ) Notice: Subject to any disclaimer, the term of this patent is extended or adjusted under 35 U.S.C. 154(b) by 235 days.

(21) Appl. No.: 13/233,632

(22) Filed: Sep. 15, 2011

(65) Prior Publication Data

US 2012/0065773 A1   Mar. 15, 2012

(30) Foreign Application Priority Data

Sep. 15, 2010   (DE) .......................... 10 2010 040 841

(51) Int. Cl.
*G06F 7/00*   (2006.01)

(52) U.S. Cl.
USPC ........................................................ 700/224

(58) Field of Classification Search
USPC ................................................ 700/224, 223
See application file for complete search history.

(56) References Cited

U.S. PATENT DOCUMENTS

| | | | |
|---|---|---|---|
| 7,703,595 B2 | 4/2010 | Berger et al. | |
| 2003/0004893 A1 | 1/2003 | Blaesche | |
| 2004/0049315 A1* | 3/2004 | Sansone et al. | 700/226 |
| 2006/0122858 A1 | 6/2006 | Miles et al. | |
| 2006/0253405 A1 | 11/2006 | Nirenberg | |
| 2006/0253406 A1* | 11/2006 | Caillon | 705/410 |
| 2007/0226088 A1 | 9/2007 | Miles et al. | |
| 2008/0154751 A1 | 6/2008 | Miles | |
| 2009/0074543 A1 | 3/2009 | Berger et al. | |
| 2009/0074557 A1 | 3/2009 | Berger et al. | |
| 2009/0177632 A1 | 7/2009 | Berger et al. | |

FOREIGN PATENT DOCUMENTS

| | | |
|---|---|---|
| DE | 10 2005 033 644 A1 | 2/2007 |
| DE | 10 2007 058 579 A1 | 3/2009 |
| DE | 10 2008 015 075 A1 | 3/2009 |

OTHER PUBLICATIONS

German Patent and Trademark Office Search Report, Dated Sep. 20, 2010.

* cited by examiner

*Primary Examiner* — Ramya Burgess
(74) *Attorney, Agent, or Firm* — Laurence A. Greenberg; Werner H. Stemer; Ralph E. Locher

(57) ABSTRACT

Objects such as flat items of mail are processed. In a registration sorting run, the objects pass through a registration sorting system and are moved thereafter into a temporary storage device. For each object, a response message is generated and transmitted to a message address. At each predetermined execution time, an execution pass is performed in which the objects are taken from the temporary storage device and passed through an execution sorting system. If a response message which specifies an action is present for the object, the object is moved to a workstation where the specified action is carried out. Otherwise, the object is moved back into the temporary storage device. In a preferably subsequent storage period, an object is taken from the temporary storage device, and moved to a workstation, when a response message is present for this object.

11 Claims, 8 Drawing Sheets

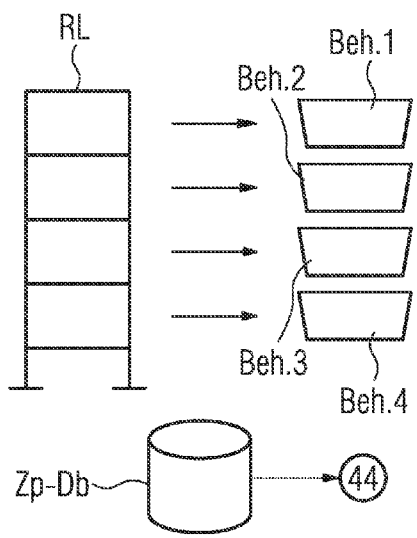
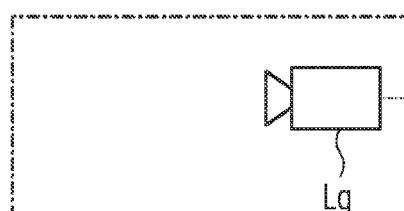
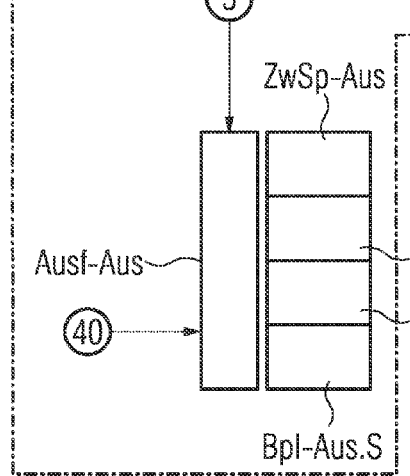
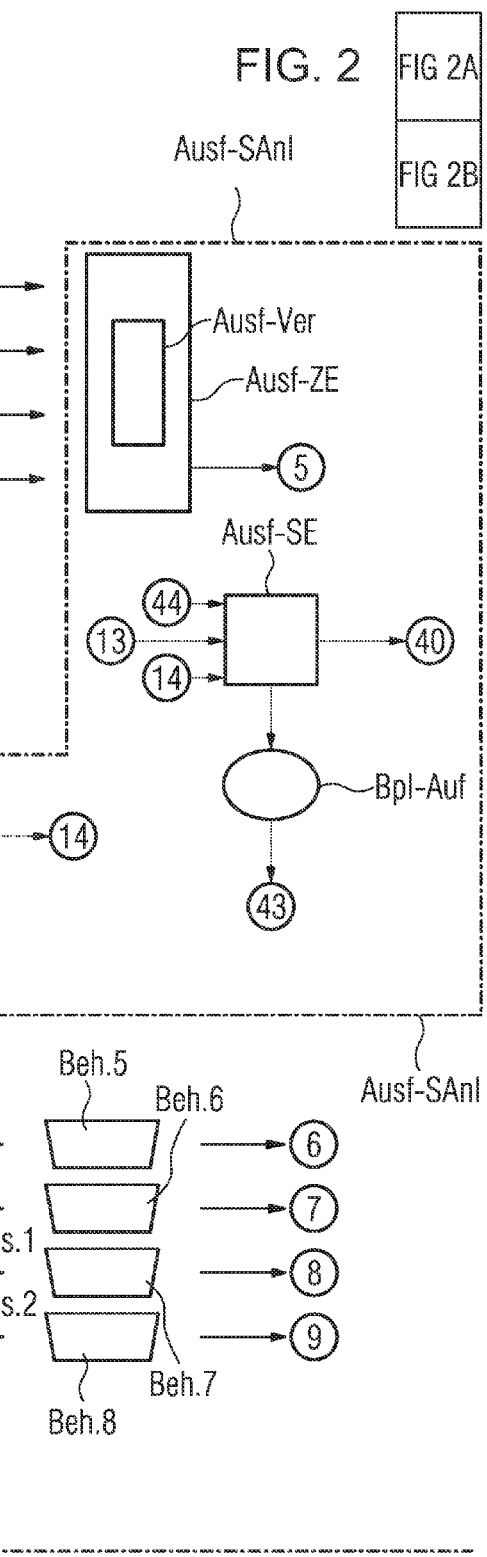
FIG. 2A
FIG. 2

METHOD AND DEVICE FOR PROCESSING OBJECTS WITH A TEMPORARY STORAGE DEVICE AND SORTING SYSTEM

CROSS-REFERENCE TO RELATED APPLICATION

This application claims the priority, under 35 U.S.C. §119, of German patent application DE 10 2010 040 841.7, filed Sep. 15, 2010; the prior application is herewith incorporated by reference in its entirety.

BACKGROUND OF THE INVENTION

Field of the Invention

The invention relates to a method and a device for processing objects, particularly flat mail items.

Several postal enterprises in each case offer a service in which a receiver of a physical mail item is informed about the arrival of the mail item in a sorting center, a delivery post office or another mailroom via Internet. For example, at least one computer-provided image of the envelope of the mail item is provided in a personal electronic mailbox in the Internet. The receiver determines what is to happen with the mail item, e.g. delivery to a delivery address specified by the receiver, a scanning and transmission of the content via Internet or destruction of the mail item graded as unwanted. Once the content has been scanned, the receiver still often wishes to have the mail item physically delivered.

Patent Application Publication No. US 2007/0226088 A1 describes an item management process for physical mail items. The physical mail items pass through a mailroom, are temporarily stored and processed and, if required, are picked out of the memory again. For example, a mail item is opened and an image is in each case generated of each document in the envelope of the mail item.

A method for handling objects is known, for example, from Patent Application Publication No. US 2006/0122858 A1. In this previously known method, objects such as, for example, letter consignments, are stored in a store which is located remote from the owners of the objects. To store the objects, they are recorded pictorially at least in part. In addition, an individual identification is allocated to each object. The position of the object in the store is linked to the individual identification and stored.

Another method for handling objects is described in Patent Application Publication No. US 2006/0253405 A1. In this method, letter consignments are recorded with the aid of a scanner. A workstation is provided for sending an image of the letter consignment, recorded by means of the scanner, together with a second image related to it, to a remotely located receiver in order to obtain instructions with respect to the handling of the respective letter consignment.

From Patent Application Publication No. US 2008/0154751 A1, a method for handling objects is known in which objects are stored in a store, information about the size of the respective objects being recorded. The objects are stored in dependence on the respective object size.

Patent Application Publication No. US 2007/0226088 A1 discloses a method for storing letter consignments in which the movement of the letter consignments is tracked with the aid of a video device.

German published patent application DE 10 2005 033 644 A1 describes a method and a device for processing plate-shaped workpieces. The workpieces are to be sorted in accordance with a sorting rule. Between two buffer arrangements 10, 10', a conveying arrangement 30 with a conveying line 32 and a return line 34 arranged underneath extends. A transfer device 20 is capable of taking a plate-shaped workpiece 2 from a buffer arrangement 10, 10' and move it onto the conveying arrangement 30, compare FIG. 1. The workpieces 2 are stored in compartments 18 of the buffer arrangement 10, 10' in parallel next to one another, the compartments 18 being formed by in each case two arms 16. The arms 16 run endlessly around a base body. A workpiece 2 is then pushed between two arms 16 when the arms are arranged in parallel with one another. A pusher 22 can push a workpiece 2 out of a compartment 18 again. In order to establish a desired order of workpieces 2 on the conveying line 32, a transfer device 20 takes the workpieces 2 required in each case out of the buffer arrangement 10, 10' and places a removed workpiece 2 on the conveying line 32 by means of rotatable intermediate shafts 24. If a workpiece 2 reaches the outlet of a buffer arrangement 10, 10' before the workpiece 2 is removed, the workpiece 2 is left in the buffer arrangement 10, 10'. Or the workpiece 2 is transported back again to the buffer arrangement 10, 10' via the return line 34 or via the conveying line 32.

German published patent application DE 10 2008 015 075 A1 describes a method for sorting mail items. Each mail item to be sorted passes through a sorting system once, is transported to a second sorting system and passes through a sorting system for a second time. During the first pass, a process attribute is measured. In addition, several features are measured. A record with the measured feature values and the measured processing attribute is generated and stored. During the repeated pass, the feature values are measured again. The record of the most similar feature value is determined and its processing attribute is used for the further transport of the mail item.

German published patent application DE 10 2007 058 579 A1 describes a method for sorting flat mail items by way of a sorting system. The sorting system Anl-1 passes the mail items successively out into an outbox Af. An initial signal start is generated. Each mail item which has been passed out into the outbox Af for this initial signal start is taken out of the outbox Af. All other mail items are moved out of the outbox Af into a container Beh-1. As soon as this moving is concluded, an end signal Q1 is generated. It is stored which mail items have been moved into the container Beh-1 between the initial signal start and the end signal Q1.

SUMMARY OF THE INVENTION

It is accordingly an object of the invention to provide a method and a device for processing articles by way of an intermediate storage and sorting system which overcome the above-mentioned disadvantages of the heretofore-known devices and methods of this general type and which provides for a method and a device for processing a number of objects, wherein the objects are temporarily stored, messages arrive in unpredictable order which relate to in each case at least one object and specify an action for processing this object, and the specified action is intended to be performed after a predetermined time interval at the latest, wherein the mechanical loading for each object should be less than in related prior art methods.

With the foregoing and other objects in view there is provided, in accordance with the invention, a method for processing a plurality of objects, wherein each of the objects is provided with a respective identification, wherein a sequence is predetermined with an execution time or a number of successive execution times, and wherein at least one maximum storage period is predetermined. The method which comprises:

passing all objects to be processed through a registration sorting system in a registration sorting run, and performing the following steps in the registration sorting run for each object to be processed:

acquiring with the registration sorting system the identification on the object;

generating an inquiry message, the inquiry message including at least one information item about the object;

determining a message address in dependence on the identification on the object;

transmitting the inquiry message to the message address;

delivering the object from the registration sorting system into a temporary storage device;

at each execution time, triggering a process sequence and subjecting all of the objects located in the temporary storage device at execution time to the following steps:

taking the object from the temporary storage device;

passing the object through an execution sorting system in an execution pass;

identifying each object with the execution sorting system in the execution pass, the removal of which from the temporary storage device was triggered at the execution time and which passes through the execution sorting system; and wherein each execution pass for each identified object includes the following steps:

checking whether or not a response message has arrived for the respective object;

thereby using as the response message for the object an incoming message that refers to the object and specifies an action that is to be performed with the object;

if a presence of a response message for the object is found, triggering the following steps:

transporting the respective object to a workstation; and performing at the workstation the action that is specified in the response message for the object;

otherwise, delivering the object with the execution sorting system and moving the object back into the temporary storage device; and if a response message that refers to an object in the temporary storage device and specifies an action to be performed with the object arrives during the storage period, taking the object from the temporary storage device; and triggering a performance of the action specified in the response message.

By means of the method according to the invention and the device according to the invention, a number of objects are processed. Each object to be processed is provided with one identifier in each case. It is possible that different objects are provided with the same identifier. In each case, at least one message address is allocated to each occurring identifier of an object. The same message address can be allocated to different identifiers.

There are predetermined an execution time or a sequence of a number of successive execution times and at least one maximum storage period.

There are performed registration sorting run, in each case one execution pass for each execution time and one individual execution per object with response message during the at least one storage period.

One registration sorting system is used for the registration sorting run, one execution sorting system for each execution pass. It is possible that the same sorting system is used both as registration sorting system and also as execution sorting system. In addition, at least one temporary storage device is used. All objects to be processed can be temporarily stored at once in the temporary storage device used or by being divided into the set of temporary storage devices used. It is also possible to use different temporary storage devices successively, each temporary storage device being able to accommodate all objects which still have to be temporarily stored now.

Firstly, the registration sorting run is performed. In the course of this registration sorting run, all objects pass once through the registration sorting system. For each object to be processed, the following steps are performed in the registration sorting run:

The registration sorting system deciphers the identifier with which the object is provided or determines this identifier on the object in a different way.

An inquiry message is generated. This generated inquiry message comprises at least one information item about the object.

An associated message address is determined in dependence on the deciphered identifier on the object.

The process of transmitting the generated inquiry message to the message address determined is triggered. For example, the inquiry message is sent into a wide area network ("push").

It is also possible to transmit a note regarding the inquiry message. For example, the inquiry message is provided in an Internet portal ("pull").

The registration sorting system extracts the object.

The object is moved into a temporary storage device.

This ends the registration sorting run.

After conclusion of the registration sorting run, the process that the following two steps are performed is triggered at each predetermined execution time:

All objects which are still located in the temporary storage device at the execution time are taken from the temporary storage device.

An execution pass for the execution time is performed in which all objects removed pass through the execution sorting system.

In each execution pass, the following steps are performed for each object, the removal of which from the temporary storage device was triggered at this execution time:

It is checked whether a response message has arrived or not for this object.

In this context, an incoming message which relates to this object and specifies an action which is to be performed with this object is used as response message for the object.

When the presence of a response message for the object is found, the following two steps are performed:

The object is transported to a processing system.

The action which is specified in the incoming response message is performed with the object.

If there is no response message for the object, the object is returned into the temporary storage device.

This ends this execution pass.

It is possible that an object is returned into the temporary storage device with each execution pass because there is no response message for this object. As a rule, there are therefore still a number of objects in the temporary storage device after conclusion of the last execution pass. It is also possible that the storage period follows the registration sorting run and that the execution passes are after the storage period in time.

During the storage period, an object is once more removed from the temporary storage device due to an individual execution. During the storage period, no execution passes are performed. The individual execution of an object is performed when during the storage period, a response message arrives which relates to this object and specifies an action. The individual execution for this object comprises the following steps:

The object is removed from the temporary storage device and transported to a processing system.

The performance of the action which is specified in the incoming response message is triggered.

The invention ensures that after a predetermined termination time each object has been processed in accordance with a response message, assuming that a response message which relates to this object and specifies an action is present by then. This termination time is either the end of the last storage period or the termination of the last execution pass in time, depending on which time is the later one.

The invention effects a compromise between the following possible methods of processing objects:

a) To process the objects in accordance with the response messages, only individual executions are performed, that is to say only incoming response messages are reacted to. The reaction to incoming response messages is such that the object specified in each case is removed from the temporary storage device and treated as specified.

b) In order to process the objects in accordance with the response messages, only execution passes are performed, all objects being removed from the temporary storage device in each execution pass.

The first variant, that is to say only individual executions, requires much time because an individual specified object must be sought and found in the temporary storage device. Depending on embodiment, this requires manual searching work by an operator, in each case one marked storing position per object or an automatic handling device which is capable of finding an object in the temporary storage device automatically by "machine vision". The temporary storage device must provide sufficient space for being able to find, grab and remove a certain object.

The second variant, that is to say only execution passes, loads the objects mechanically more strongly than is done by the present invention. With each execution pass, each object which previously was still located in the temporary storage device is transported through the execution sorting system and during its process is mandatorily subject to accelerations and delays and possibly also subject to rotating or tilting movements. This also happens when there is no response message present for the object until the last execution pass.

The invention represents a compromise between these two extreme variants. The arrangement can be parameterized in order to achieve a good compromise for a particular application.

In particular, the following parameters can be varied in order to achieve predetermined aims with respect to time expenditure, reaction time to response messages, processing costs and mechanical loading of the objects, the temporary storage device, the registration sorting system and the execution sorting system being predetermined:

the number of execution times, and thus also the number of execution passes, the time interval between two successive execution times which can vary from execution time to execution time, whether the storage period begins after the last execution time, ends before the first execution time or is located between two execution times, and the beginning and the end of the storage period.

These parameters can be varied without having to perform any mechanical changes on a sorting system or a temporary storage device.

The response messages can arrive in random order and at random unpredictable times. It is possible to measure the times at which inquiry messages arrive in a trial phase, to statistically evaluate these measurement results and adapt the above-mentioned parameters in dependence on the statistical evaluation. For example, the storage period begins after the last execution time. The execution times are placed in such a manner that—according to the statistical evaluation—it can be expected that a maximum of x% of the objects are still located in the temporary storage device after the last execution pass and all other objects have already been processed in accordance with a response message.

In comparison with the first variant (only individual executions), the invention saves storage space in the temporary storage device without an additional operating step being required for releasing the storage space. To perform an execution pass, all objects which are still located in the temporary storage device are removed from the temporary storage device. After this execution pass, all objects without response message are moved back into the temporary storage device in one step.

The temporary storage device can be set up spatially separated from the sorting system or from all sorting systems so that different requirements can be implemented. Each sorting system is to be supplied with objects. Each sorting system must be maintained from time to time and disturbances may have to be eliminated. Objects must be taken from the temporary storage device and conversely objects must be stored in the temporary storage device. This frequently requires different maintenance work.

During the storage period, neither the registration sorting system nor the execution sorting system are needed for processing these objects. These sorting systems can therefore be used during the storage period for processing further objects and/or for carrying out maintenance or repair work on them.

The temporary storage device can be constructed in a mechanically simple manner. In the simplest case, the temporary storage device has no moving parts at all but only fixed parts.

The respective identifier with which each object to be processed is provided can be an identifier of a destination to which the object is to be transported, or an identifier of a natural or legal person who is to receive this object. It is also possible that the identifier is an unambiguous identifier which distinguishes this object from all other objects to be processed within a certain period. The identifier can also identify the type of the object, especially if this type cannot be visually recognized from the outside.

In one embodiment, the inquiry message comprises this determined object identifier as information about the object. In another embodiment, the inquiry message comprises a computer-provided image of the object. The inquiry message can comprise both an object identifier and an image.

In one embodiment, an object to be processed is provided with a destination identifier due to the fact that an alphanumeric identifier of the destination is applied to the object, e.g. a postal delivery address. In another embodiment, a machine-readable identification of the destination, e.g. a bar pattern is printed on. This is known, e.g. for baggage items of air passengers. It is also possible that a machine-readable identification is applied to the object, e.g. an identifier, and a record with this identifier and the destination identification is stored in a database. The destination identification can be determined by reading the identifier on the object and transmitting a search request to this database with the identifier.

Preferably, a number of temporary storage devices are used. These temporary storage devices can also be different areas of the same temporary storage device. These temporary storage devices can be distinguished from one another in their respective accommodation capacity. In each execution pass, it is determined which accommodation capacity is needed for the objects which pass through the execution sorting system in this execution pass and for which no response message is yet present. Depending on the needed accommodation capacity determined, a temporary storage device with sufficient accommodation capacity is selected. This embodiment enables the existing temporary storage devices to be utilized as well as possible. In each case, only one temporary storage device is needed at one time.

In one embodiment, the storage period is after the last execution time in time. Or the storage period begins at the last execution time. In this embodiment, each execution pass is first performed and concluded before the storage period begins. This embodiment makes it possible to pass many objects already out through the execution passes, and to treat them as specified, when many response messages arrive after the registration sorting run and only a few response messages do so long after the registration sorting run. In this embodiment, many objects are thus recorded by a more strongly automatable execution pass and the necessary individual execution is required more rarely for an object during the storage period.

In another embodiment, the storage period is located before the first execution pass in time. This makes it possible to treat such objects for which response messages arrive early, already before the first execution pass and thus without any greater mechanical loading. It is then up to the sender of a response message to send his response message early enough so that an execution pass is avoided for the object. It is possible to refer to the first execution time in the response message. This embodiment reduces the mechanical loadings for objects for which response messages arrive early because no execution pass is performed for these objects.

In a third embodiment, a first storage period and a second storage period are predetermined. The execution times are located between these two storage periods. In each storage period, an object is taken from the temporary storage device when a response message for this object has arrived.

Preferably, the time interval between the first and the second execution time is smaller than the time interval between the second and the third execution time. Thus, less time elapses between the beginning of the first execution pass and the beginning of the second execution pass than between the beginning of the second execution pass and the beginning of the third execution pass. This embodiment mainly leads to a rapid reaction to response messages where initially many response messages arrive and then fewer and fewer.

In one embodiment, the step of moving objects into the temporary storage device comprises the steps of taking the objects from the sorting system used in each case and moving them into containers and transporting them in these containers to the temporary storage device. Conversely, the step of taking objects from the temporary storage device comprises the steps of transporting the objects to the execution sorting system in the containers and then taking them from the containers used in each case.

In another embodiment, each object is connected to a holding device ("holder") during the registration sorting run and remains in this holder until the object is to be transported to a processing system because a response message is present, or remains in the holder even until this processing system is reached.

In one embodiment, the same sorting system is used both as registration sorting system and as execution sorting system.

In another embodiment, a sorting system is used as registration sorting system and another sorting system as delivery sorting system.

Preferably, the inquiry message and the response message are sent in electronic form, e.g. as E-mail or as digitized voice message. It is also possible that the inquiry message and/or the response message are sent in the form of a mail item, e.g. as notification or response postcard.

The message address is preferably determined by selecting a message address from a predetermined set of message addresses in dependence on the identifier on the object. For example, each identifier on an object designates a natural or legal person who is to receive the object and the message address is a stored electronic or postal address of this person. This set of message addresses contains the possible message addresses preferably in electronic form. The message addresses are, e.g., E-mail address or telephone numbers or fax numbers or also identifications of data-processing devices.

In one embodiment, the inquiry message is conveyed to the determined message address in every case ("push"). For example, a notification is conveyed in the form of an E-mail to the message address. It is also possible to convey to the message address a reference to a storage location, the inquiry message being stored at this storage location. The notification has the form, e.g., of an E-mail with a reference in the form of an Internet link to a URL (uniform resource locator).

In another embodiment, the inquiry message is provided for retrieval ("pull"). After authentication, a registered receiver can trigger the step that the response message is transmitted to the message address. For example, a portal is provided in the Internet. A registered receiver enters a password or authenticates it in a different manner. Once the receiver has successfully authenticated himself, the receiver is provided with the possibility of downloading the response messages for objects to this receiver.

The execution sorting system has preferably at least one temporary-store sorting output and at least one processing sorting output per processing system used. The execution sorting system passes each object, for which a response message is present, out into a processing sorting output during an execution pass. The execution sorting system passes each object for which no response message is present out into a temporary-store sorting output. In the case of a number of temporary storage devices, there is preferably at least one sorting output per temporary storage device in each case. The execution sorting system controls the number of objects which are to be moved into which temporary storage device. In the case of a number of possible actions, the execution sorting system has preferably at least one processing sorting output per possible action and passes an object out into a processing sorting output allocated to the action in dependence on the specified action.

It is possible that there are still objects in the temporary storage device after the end of the termination time which is located after the storage period and after the last execution pass, namely because no response messages have arrived for these objects. These objects are preferably taken from the temporary storage device after the termination time and subjected to a standard treatment. For example, the objects are transported to the respective destination which is predetermined by the identifier on the object. It is possible that a standard treatment is predetermined for at least one destination and all objects with an identifier of this destination are subjected to this predetermined standard treatment.

The objects are, e.g., flat mail items (standard letters, large letters, postcards), small parcels, packets or also goods to certain receivers. The objects can also be workpieces, wherein each workpiece has to be transported to in each case one component of a production system, e.g. for vehicles and, certain components of the production system need certain workpieces at particular times and send out corresponding response messages depending on the progress of production. The inquiry messages specify which workpieces are currently available. The objects can also be baggage items of travelers which travel separately from the baggage, e.g. air passengers or ship passengers. In particular, the invention can be used for informing travelers about the locating of lost baggage items. The objects can also be freight items. The objects can also be medicaments or cosmetics.

Other features which are considered as characteristic for the invention are set forth in the appended claims.

Although the invention is illustrated and described herein as embodied in a method and device for processing objects by means of a temporary storage device and a sorting system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

In the exemplary embodiment, the invention is used for processing mail items (postcards, standard letters, large letters, catalogs, parcels, . . . ). In one embodiment, this receiver identifier comprises the name of a natural or legal person who is the receiver of the mail item, and a postal address of the receiver (street, house number or mailbox number or parcel box number and postcode or ZIP code and town).

In another embodiment, this receiver identification comprises the receiver name and the postal address of a mail service provider who temporarily stores the mail items and notifies the receiver and, in doing so, performs the method steps which will be described in the text which follows. The receiver is registered with the mail service provider. To distinguish the mail items of different receivers who are registered with the same mail service provider from one another, the mail item is provided with an identifier of the receiver, e.g. with a customer number. It is also possible that a message address is applied to the mail item, e.g. an E-mail address of the receiver.

Each mail item consists of a packaging element, e.g. a letter envelope or a parcel wrapping, and one or more content objects, e.g. sheets in a letter envelope or objects in a parcel. Postcards are an exception—a postcard acts as a content object itself. A special form of a postcard is a "business reply mail item." As a rule, the sheets are provided with symbols and/or images and can be visually recorded.

The method is performed with the aid of a processing system. In the exemplary embodiment, this processing system comprises a registration sorting system for performing the registration sorting run described further below, an execution sorting system for performing each execution pass described further below, a physical temporary storage device for mail items, at least one workstation for mail items, a receiver data memory for registered receivers of mail items, a mail item data memory, a message generating facility, a message transmission facility and a message evaluation facility.

In the exemplary embodiment, the registration sorting system comprises a feeder with a singulator, a reader for receiver identifications, a printer or labeler, a set of scales in one embodiment, a multiplicity of sorting terminals and a control unit.

Figures 1, 1A, 1B:
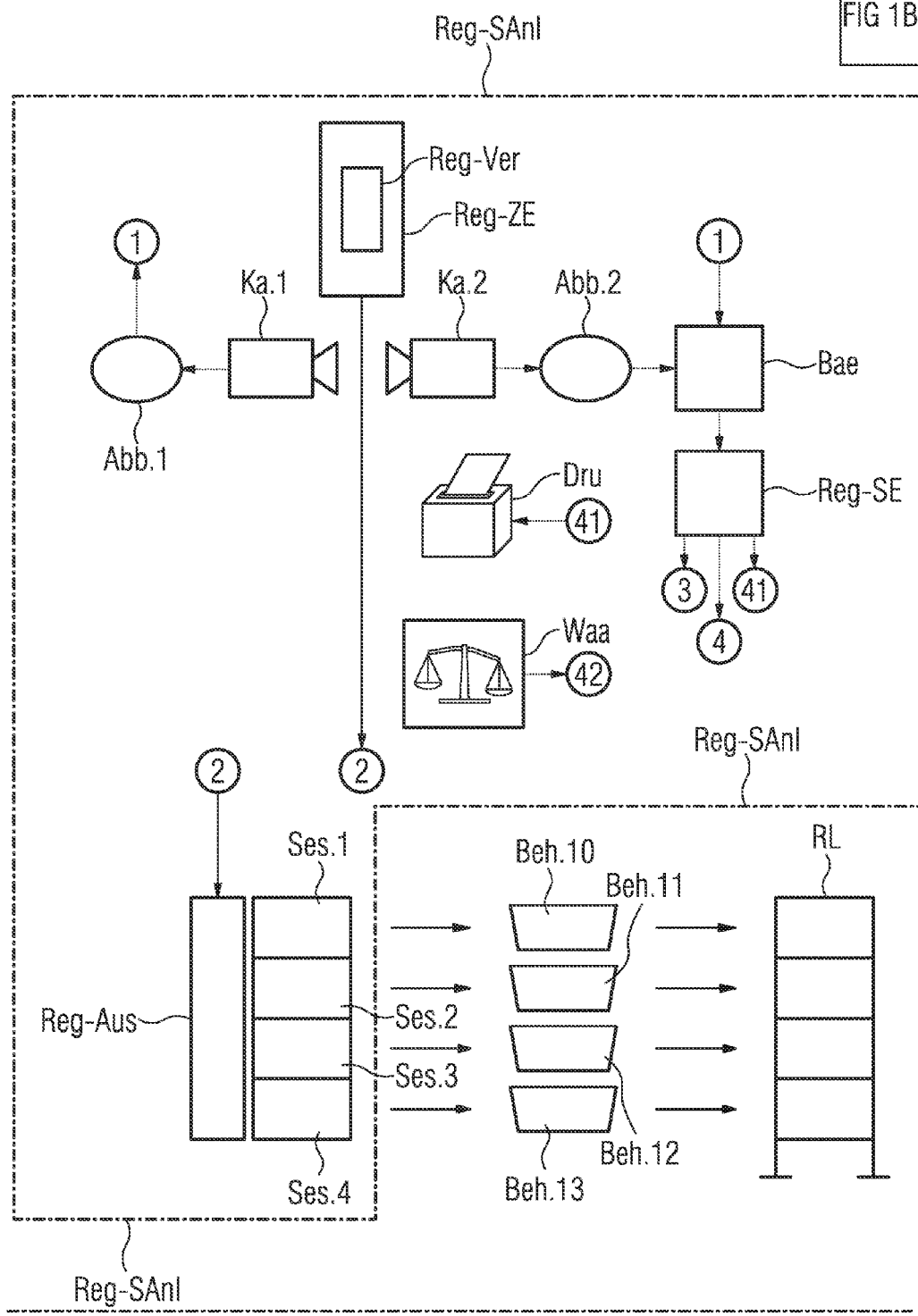
FIG. 1 shows diagrammatically the registration sorting system and the further components which are used for the registration sorting run.
Figure 1B:
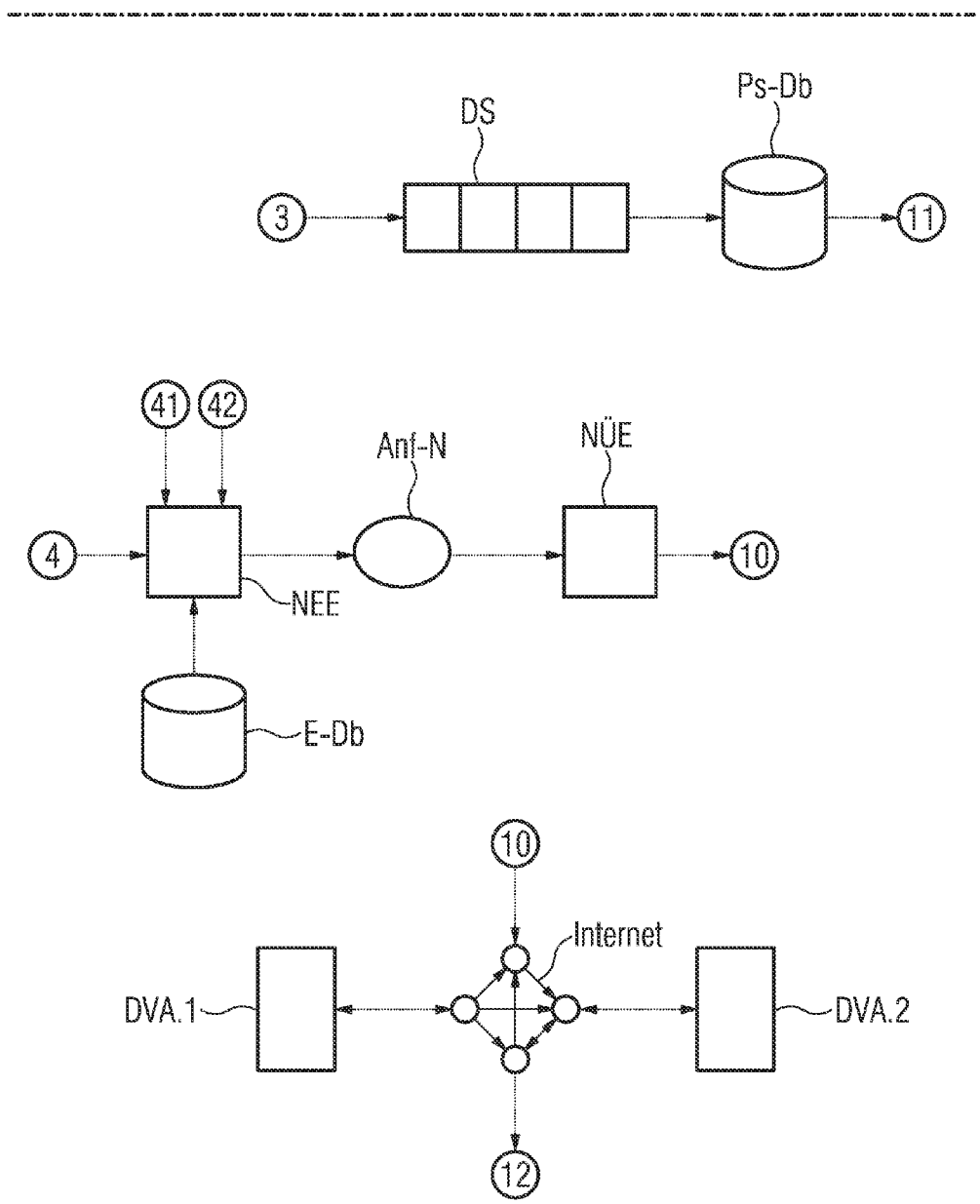
Figure 2B:
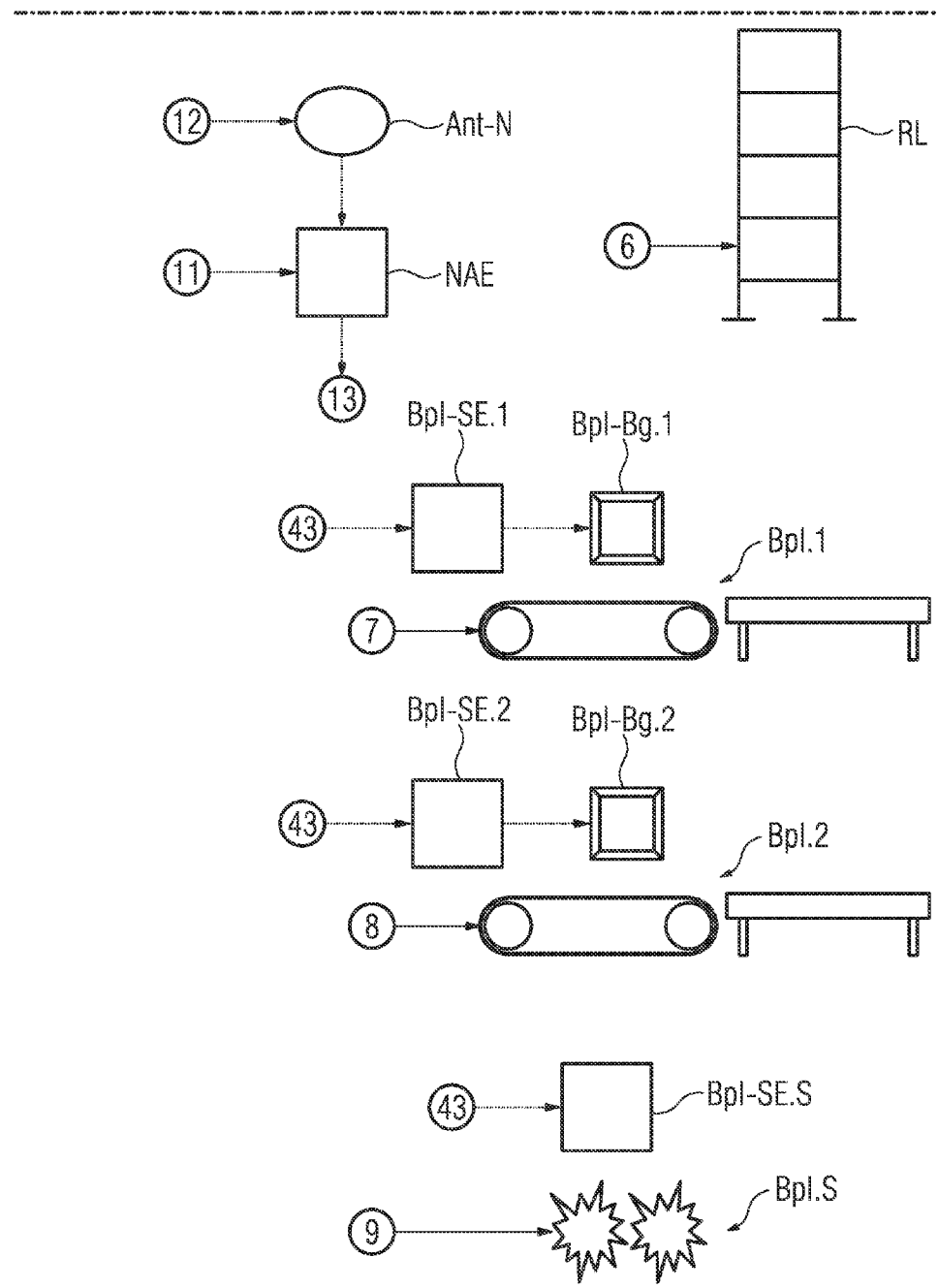
FIG. 2 shows diagrammatically the execution sorting system and the further components which are used for each execution pass.

Referring now to the figures of the drawing in detail and first, particularly, to FIGS. 1 and 2 thereof, there is shown a diagrammatic illustration of the registration sorting system and the other components which are used for the registration sorting run. In FIG. 1 and FIG. 2, continuous arrows designate material flows, dashed arrows designate data flows.

FIG. 1 shows:

the feeder Reg-ZE of the registration sorting system Reg-SAnl with the singulator Reg-Ver, two cameras Ka.1, Ka.2, an image evaluation unit Bae, a printer Dru, a set of scales Waa, a delivery device Reg-Aus, e.g. four sorting terminals Ses.1, . . . , Ses.4, the control unit Reg-SE of the registration sorting system Reg-SAnl, the receiver data memory E-Db, the mail item data memory Ps-Db, the message generation facility NEE, the message transmission facility NÜE and the message evaluation facility NAE.

The feeder Reg-ZE is arranged for supplying mail items to the further components of the registration sorting system Reg-SAnl in such a way that the registration sorting system is capable of sorting these mail items. The singulator Reg-Ver isolates mail items and during this process pulls apart mail items which overlap. In the case of flat mail items, the singulator Reg-Ver generates a stream of mail items which are spaced apart and stand upright. Parcels are pulled apart by the singulator Reg-Ver in such a manner that they do not overlap.

The reader comprises an image recording device and an image evaluating unit. The image recording device generates at least one image, available on computer, of the surface of the mail item which is provided with the receiver identification.

In the example of FIG. 1, the image recording device comprises the two cameras Ka.1, Ka.2 which in each case generate an image Abb.1, Abb.2, available on computer, of each surface of a mail item transported standing upright.

These images Abb.1, Abb.2 are transmitted to the image evaluating unit Bae.

The image evaluating unit Bae evaluates each image Abb.1, Abb.2, available on computer, in order to decipher the receiver identification. The image evaluating unit Bae comprises an OCR unit which attempts to decipher the receiver identification by optical character recognition (OCR). If this is unsuccessful, an operator inputs part of the receiver identification by a keyboard (video coding) or by voice input (speech recognition).

Each sorting terminal Ses.1, . . . , Ses.4 of the registration sorting system Reg-SAnl can accommodate a number of mail items in each case. In the case of flat mail items, the registration sorting system Reg-SAnl in each sorting terminal Ses.1, . . . , Ses.4 can in each case generate a stack of mail items. These stacked mail items are, e.g., standing upright or on one edge in each case. The mail items can also lie in the sorting terminal Ses.1, . . . , Ses.4.

In the receiver data memory E-Db, one record is stored for each registered receiver of mail items in each case. This record comprises:
- an unambiguous internal identifier for the registered receiver which distinguishes this receiver from all other registered receivers,
- at least one receiver identification with which mail items to this registered receiver can be provided, wherein a number of possible receiver identifications 5 can be stored for one registered receiver,
- at least one message address for inquiry messages to this receiver, wherein the message address can be, e.g., an E-mail address, a telephone number, a fax number or also a mail address and wherein a number of different message addresses can be stored for one receiver,
- in the case of a number of message addresses for the same receiver, a selection rule for selecting a message address, the selection rule depending, e.g., on the inquiry time and/or on the type of mail item,
- the identification of an actual delivery address to which the mail item to this receiver is actually to be transported, wherein this delivery address identification can match a possible receiver identification or also deviate from each stored receiver identification.

In one embodiment, a potential receiver identification on a mail item to a registered receiver matches the identification of a delivery address to which the mail item is actually to be transported.

In another embodiment, special receiver identifications are used for mail items to registered receivers which consists, e.g.,
- of the name of the receiver,
- of an identifier of the receiver, e.g. in the form of "post office box 123", and
- the name and the address of a service provider.

The embodiment with the special receiver identifications saves the registered receiver from having to inform possible senders about his actual delivery address. This service provider then carries out the method steps described in the text which follows. An execution pass for a first set of mail items can be performed overlapping in time with the registration sorting run for a subsequent time set of mail items.

In the mail item data memory Ps-Db, a record Ds is established for each mail item to a registered receiver. This record Ds comprises
- an unambiguous identifier for the mail item,
- after the deciphering of the receiver identification, a coding of the registered receiver of this mail item,
- at least one image, available on computer, of a surface of the mail item, and
- after reception of a response message for this mail item, a coding for the action which is to be performed with this mail item according to a specification of the receiver.

Each record Ds in the mail item database Ps-Db is supplemented by further information in the course of the method.

In the exemplary embodiment, the physical temporary storage device for mail items comprises a shelf storage unit RL and a number of containers Beh.1, . . . . The shelf storage unit RL comprises a number of placement spaces for one container in each case. Each container Beh.1, . . . can accommodate a number of mail items and is provided with an unambiguous container identifier which distinguishes this container from all other containers of the temporary storage device. Each placement space preferably has a placement space identifier in each case. This arrangement facilitates finding the mail items again later in the temporary storage device RL.

The message generating facility NEE has read access to the receiver data memory E-Db. The message generating facility NEE is capable of determining whether a record is established and stored in the receiver data memory E-Db for a receiver or not and whether this record comprises a message address. Furthermore, the message generating facility NEE can generate an inquiry message Anf-N to a registered receiver, the inquiry message Anf-N comprising information about a mail item to this receiver. The message transmission facility NÜE is arranged for transmitting the inquiry message Anf-N to the or to a specified message address of the receiver. The message evaluating facility NAE can evaluate incoming response messages from specified receivers.

Referring now to FIG. 2 there is shown a diagrammatic illustration of the execution sorting system Ausf-SAnl and the other components which are used for each execution pass. FIG. 2 shows:
- a feeder Ausf-ZE of the execution sorting system Ausf-SAnl,
- a reader Lg of the execution sorting system Ausf-SAnl which can decipher a bar pattern BC on a mail item,
- a delivery device Ausf-Aus of the execution sorting system Ausf-SAnl,
- a control unit Ausf-SE of the execution sorting system Ausf-SAnl,
- a times data memory Zp-Ds,
- a temporary-store sorting output ZwSp-Aus for the temporary storage device RL,
- two manual workstations Bpl.1, Bpl.2, in which mail items are processed manually,
- two workstation sorting outputs Bpl-Aus.1, Bpl-Aus.2 for the two manual workstations Bpl.1, Bpl.2,
- a workstation Bpl.S in which mail items are automatically destroyed (shredder),
- a workstation sorting output Bpl-Aus.S for the automatic workstation Bpl.S (shredder),
- the shelf storage unit RL and
- eight containers Beh.1, . . . , Beh.8.

In the times data memory Zp-Ds, codings of the following times are stored:
- codings of n execution times Ausf-T(1), . . . , Ausf-T(n),
- codings of m test times Prüf-T(1), . . . , Prüf-T(m) and preferably a coding of the end of the storage period Aufb-ZR.

It is possible that codings of absolute times are stored. Preferably, however, the times relate to a reference time, e.g. the beginning of the registration sorting run Reg-Sl. Each relative time specifies a time interval on this predetermined, but time-variable reference time.

In the exemplary embodiment, each manual workstation Bpl.1, Bpl.2 for a mail item comprises in each case
- a data processing system with a control unit,
- a screen device,
- a device for opening mail items,
- an image recording device in the form of a scanner,
- an enveloping device and
- an identification facility for identifying a mail item generated.

In the example of FIG. 2, the manual workstation Bpl.1 has a control unit Bpl-SE.1 and a screen device Bpl-Bg.1. The manual workstation Bpl.2 has a control unit Bpl-SE.2 and a screen device Bpl-Bg.2. The automatic workstation Bpl.S (shredder) has a control unit Bpl-SE.S, it does not need a screen device.

In the method according to the solution, three different sequences of method steps are performed for a particular set of mail items:
- a registration sorting run once,
- in each case one execution sorting run per predetermined execution time and
- if necessary, an individual execution, preferably in each case once per predetermined test time.

Figure 3:
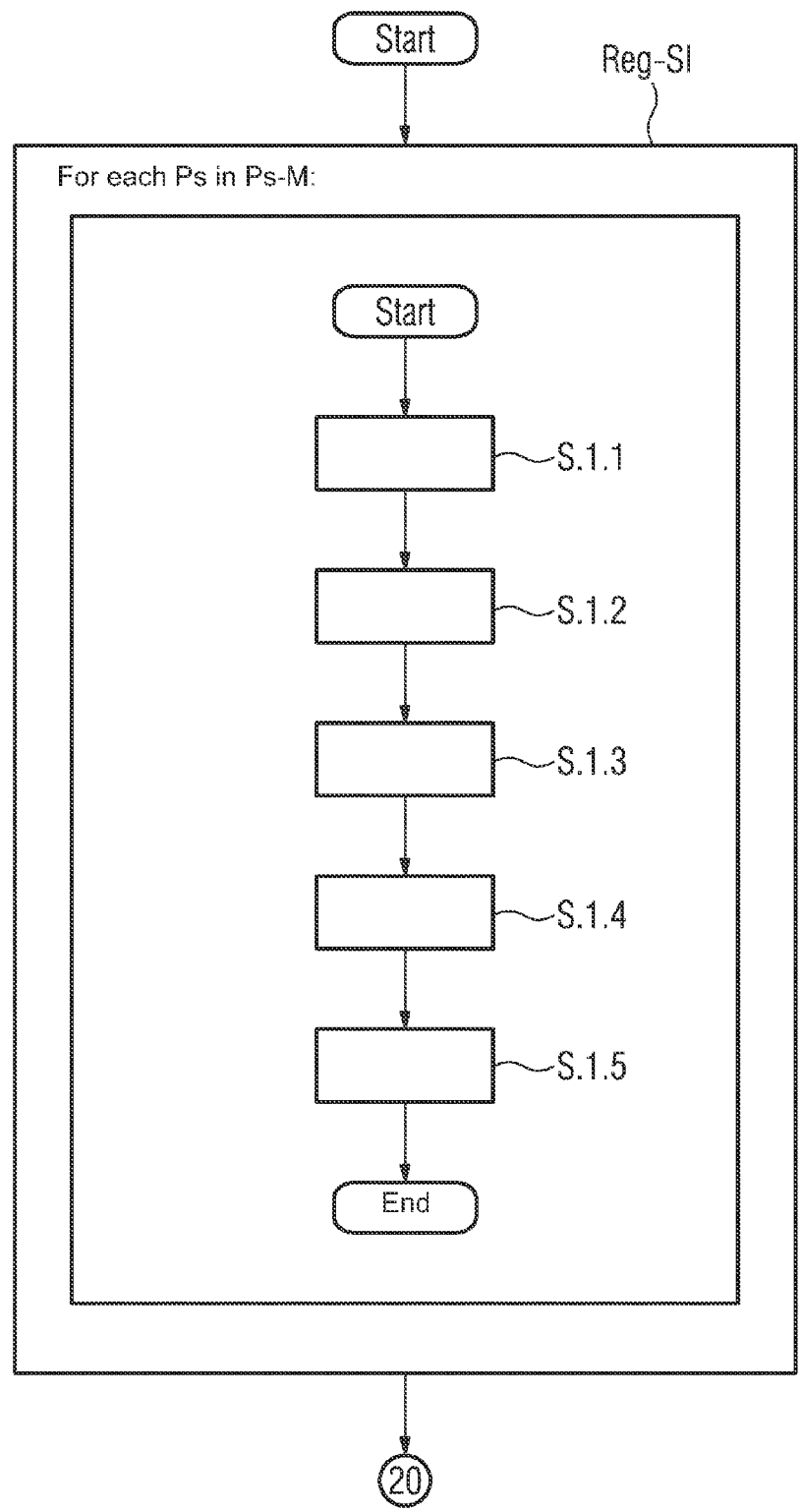
FIG. 3 shows a flow chart which illustrates the steps which are performed during the registration sorting run.
Figure 4:
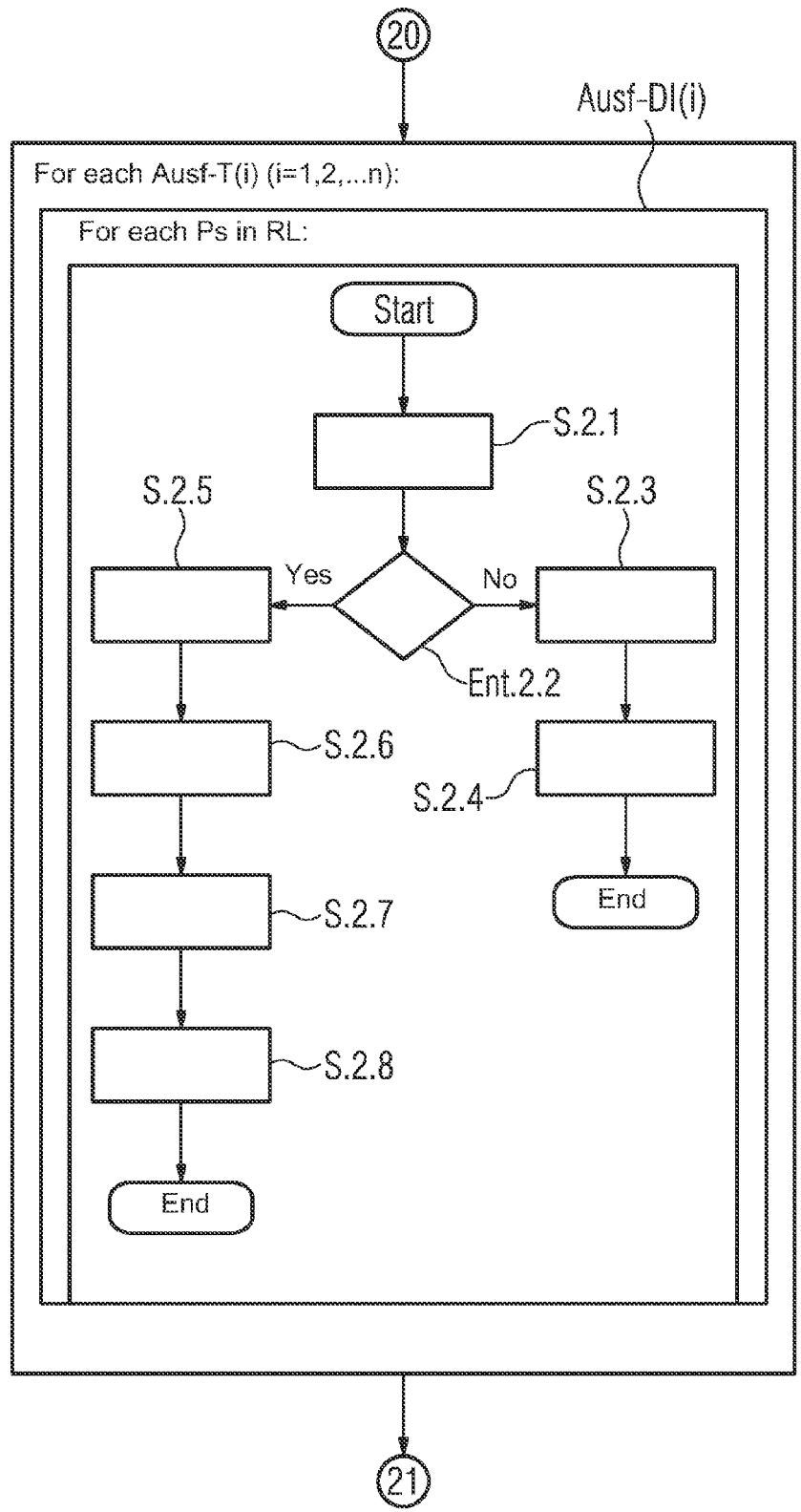
FIG. 4 shows the steps which are performed with each execution pass.
Figure 5:
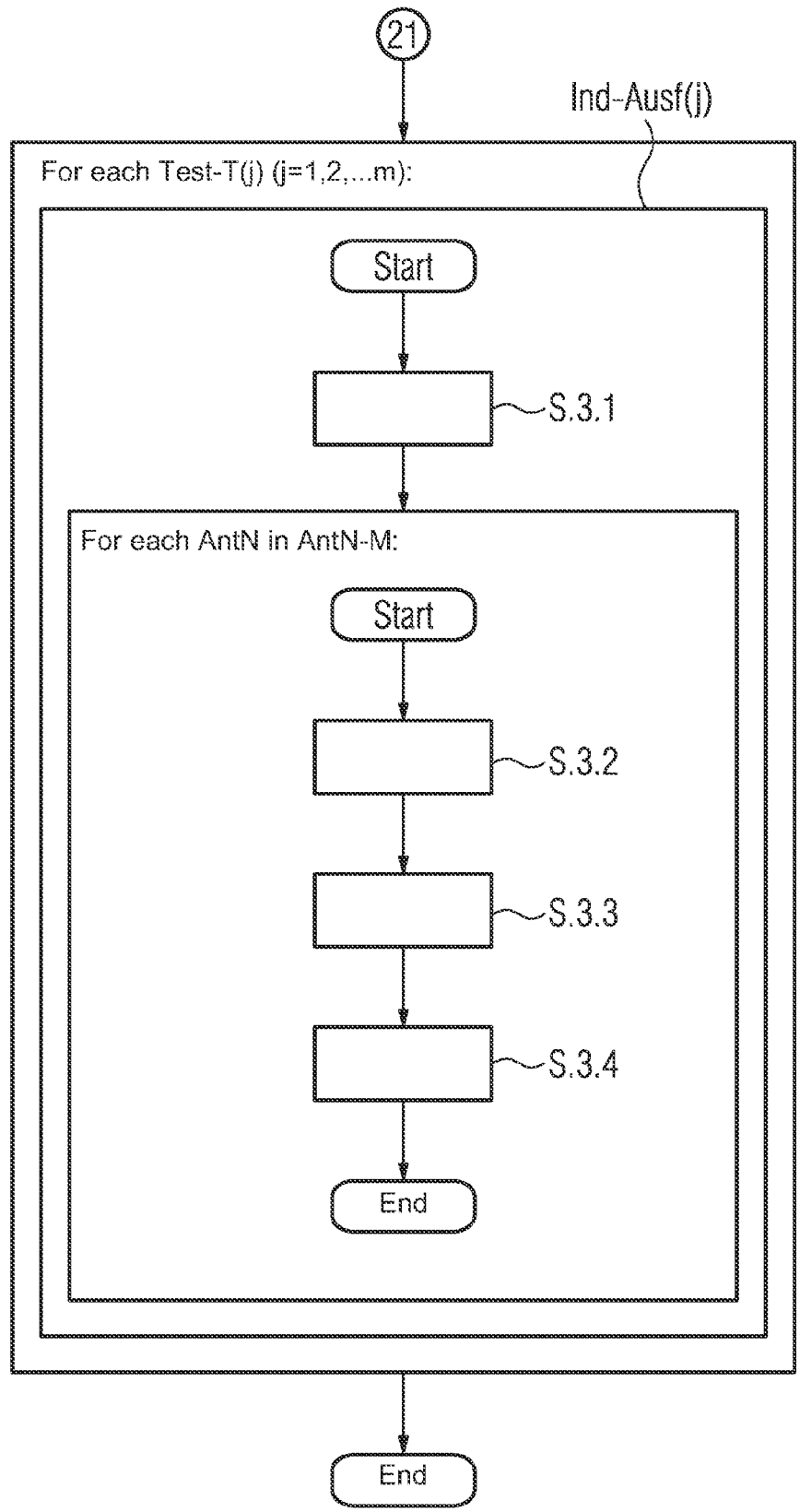
FIG. 5 shows the steps which are performed during each individual execution.

FIG. 3, FIG. 4 and FIG. 5 illustrate by means of a flow chart the steps which are performed during the processing of the mail item. They show:
- the registration sorting run Reg-Sl (FIG. 3),
- the execution pass Ausf-Dl(i) for the predetermined execution time Ausf-T(i) (i=1, 2, ..., n) (FIG. 4),
- the individual execution Ind-Ausf(j) for the test time Prüf-T(j) (j=1, 2, ..., m) (FIG. 5).

Figure 6:
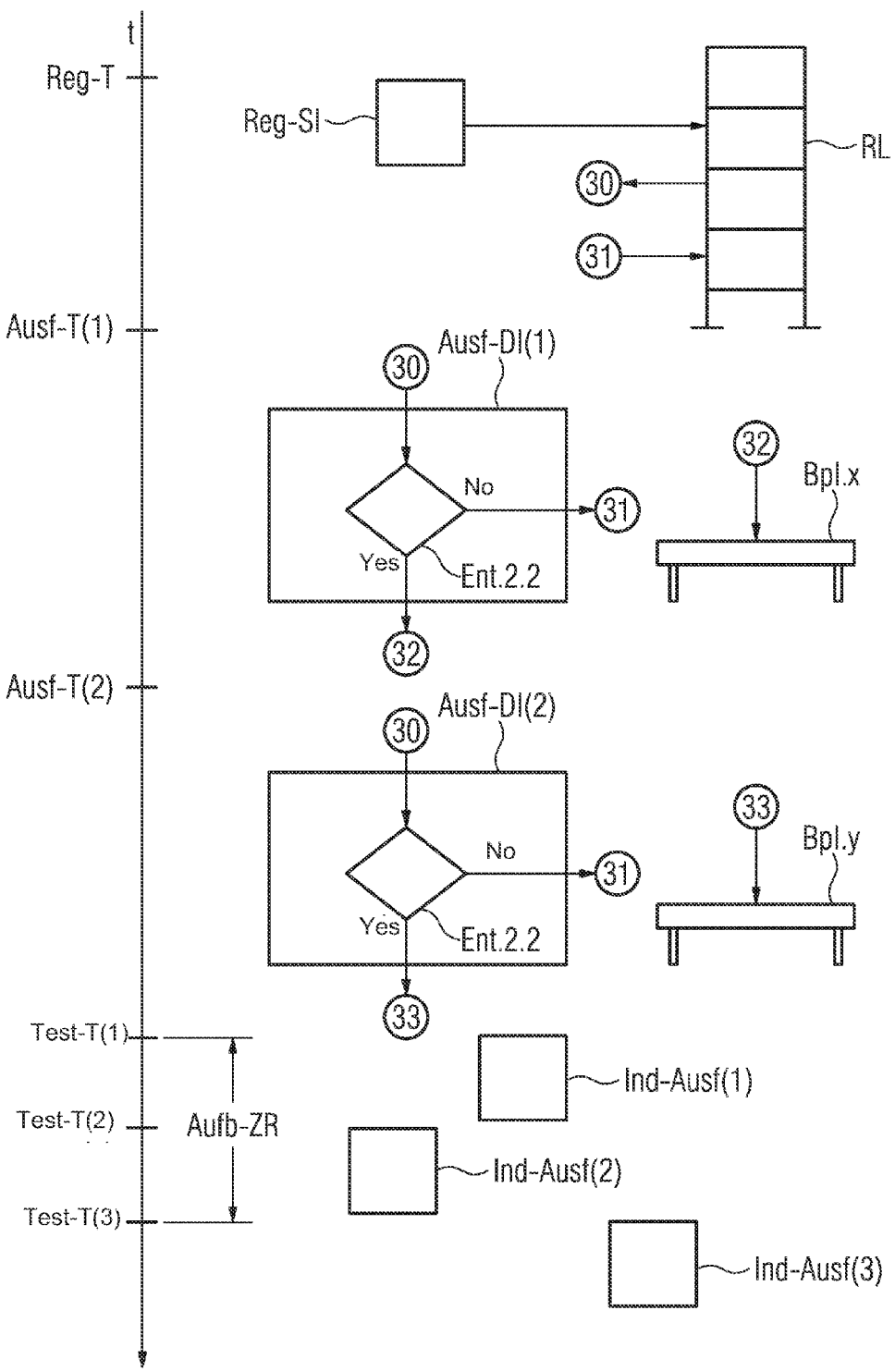
FIG. 6 shows on a time axis the sequence in time of the registration sorting run, of the execution passes and of the individual executions.

FIG. 6 illustrates the steps of FIG. 3, FIG. 4 and FIG. 5 along a time axis.

A set Ps-M of mail items reaches a processing center of the transport service provider in a certain period. All mail items of this set Ps-M pass once through the registration sorting system Reg-SAnl in the registration sorting run Reg-Sl.

In the registration sorting run Reg-Sl, the following steps are performed for each mail item of the set Ps-M to a registered receiver:

The image recording device Ka.1, Ka.2 of the reader generates a computer-available image Abb.1, Abb.2 of the surface of the mail item which shows the receiver identification. The image evaluating unit Bae evaluates this at least one image Abb.1, Abb.2 and deciphers the receiver identification on the surface of the mail item.

The registration sorting system Reg-SAnl checks whether this receiver identification identifies a registered receiver, that is to say a receiver for whom a record is established and stored in the receiver data memory E-Db. In one embodiment, the reader of the sorting system checks whether the receiver identification has a certain form, e.g. has the name and the address of a certain service provider and a receiver identifier. In another embodiment, the reader compares the deciphered receiver identifications with receiver identifications in records of the receiver data memory E-Db and decides in the case of a match that this mail item is intended for a registered receiver.

The registration sorting system Reg-SAnl generates an unambiguous identifier BC for the mail item. This unambiguous identifier BC distinguishes this mail item from any other mail item to a registered receiver which passes through the registration sorting system Reg-SAnl in a particular period of time. This unambiguous identifier BC does not necessarily need to distinguish the mail item from other mail items to unregistered receivers.

The registration sorting system Reg-SAnl determines the internal identifier for the registered receiver for which purpose the registration sorting system Reg-SAnl evaluates the deciphered receiver identification on the mail item and compares the records in the receiver data memory E-Db with this receiver identification.

The registration sorting system Reg-SAnl generates a record Ds for the mail item. This record Ds comprises the generated unambiguous identifier BC for the mail item and the determined internal identifier of the receiver of this mail item. This record Ds is stored in the mail item data memory Ps-Db The registration sorting system Reg-SAnl supplements the record Ds for the mail item by the computer-available image Abb.1 of the surface of the mail item which shows the receiver identification.

In one embodiment, the image evaluating unit Bae of the registration sorting system Reg-SAnl additionally attempts to determine the sender who has sent the mail item to the registered receiver. For example, the image evaluating unit Bae determines in the image Abb.1 of the mail item surface the image of a logo of a sender and searches through a database with the logos of and further information on possible senders. Or the image evaluating unit Bae deciphers text information on a sender in the image Abb.1. The registration sorting system Reg-SAnl supplements the record for the mail item by an identification of the sender of the mail item.

The registration sorting system Reg-SAnl activates the printer Dru or a labeler of the registration sorting system Reg-SAnl. This printer Dru or labeler provides the mail item with a machine-readable coding BC of the unambiguous identifier of the mail item. For example, a printer Dru prints a bar pattern BC (bar code) onto a label and the labeler applies this printed label to the mail item.

The registration sorting system Reg-SAnl selects a sorting terminal Ses.1, ..., Ses.4 in dependence on a predetermined sorting feature. The sorting feature is, e.g.,
- the coding of the unambiguous identifier,
- the receiver identification on the mail item,
- the time at which the mail item has arrived in the processing system, or
- a physical property of the mail item, e.g. its weight or a dimension.

The registration sorting system Reg-SAnl delivers the mail item into the selected sorting terminal Ses.1, ..., Ses.4. From this sorting terminal Ses.1, ..., Ses.4, the mail item is transported into the temporary storage device RL. For example, a stack with mail items to registered receivers is moved from the sorting terminal Ses.1, ..., Ses.4 into a container Beh.10, ..., Beh.13 and the filled container Beh.10, ..., Beh.13 is transported to the shelf storage unit RL and placed on a storage space of the shelf storage unit RL. This shelf storage unit RL acts as temporary storage device.

In one embodiment, the sorting feature facilitates finding of the mail items in the temporary storage device RL. The printed-on coding of the mail item identifier or the receiver identification is then used as sorting feature.

In another embodiment, different containers are used for different types of mail items. A physical property is then preferably used as sorting feature.

In a simpler embodiment, no sorting feature is used. The mail items are distributed to the sorting terminals Ses.1, ..., Ses.4 in such a manner that the mail items can be moved rapidly out of the sorting terminals Ses.1, ..., Ses.4 into the temporary storage device RL and a predetermined maximum filling level of each sorting terminal Ses.1, ..., Ses.4 is not exceeded.

In a particularly simple embodiment, only two sorting terminals are used. The registration sorting system Reg-SAnl delivers mail items into the first sorting terminal until this first sorting terminal is filled. The registration sorting system Reg-SAnl then delivers mail items into the second sorting terminal until this is also filled. In the meantime, the first sorting terminal is emptied. After the second sorting terminal is filled, this is emptied and the mail items are removed again into the first sorting terminal and so forth.

In one embodiment, the registration sorting system Reg-SAnl has a set of scales Waa. This set of scales Waa weighs each mail item to a registered receiver. The record Ds for the registered mail item is supplemented by an identification of the weight measured. The information about the measured weight makes it easier for the registered receiver to decide what is to happen to the mail item.

The registration sorting system Reg-SAnl calls up the message generating facility NEE so that the message generating facility NEE generates an inquiry message Anf-N for this mail item.

The message generating facility NEE generates an inquiry message Anf-N to the registered receiver of the mail item and for this mail item. The inquiry message Anf-N comprises:
- the unambiguous identifier BC with which the mail item has been provided,
- the computer-available image Abb.1 of the surface and
- in one embodiment, further information on the mail item. This further information can include the following data:
  - the weight of the mail item which has been measured by the set of scales Waa,
  - the time at which the computer-available image Abb.1 of the surface of the mail item has been generated and/or
  - the time at which the request message Anf-N has been generated, and
  - an identification of the sender of the mail item.

The message generating facility NEE determines the record for the registered receiver of this mail item in the receiver data memory E-Db. In this record, at least one message address of this receiver is stored. If a number of message addresses have been stored for the same receiver, the message generating facility NEE uses a stored selection rule in order to select, and thus to determine, a message address.

The message transmission facility NÜE triggers the transmission of the inquiry message Anf-N to this message address. For example, the message transmitting facility NÜE sends the inquiry message as an E-mail to the stored message address. Or the message transmission facility NÜE sends a notification to the message address. A receiver authorizes himself, e.g. with a password and/or electronic signature, and then has access to the inquiry message via Internet. It is also possible that the message transmission facility generates a notification mail item, e.g. in the form of a postcard. This notification mail item is sent into a stored mail address of the registered receiver.

As soon as these steps have been performed for each mail item of the set Ps-M, the registration sorting run Reg-Sl is concluded.

FIG. 3 illustrates the registration sorting run Reg-Sl. In this figure:

S.1.1 is the step that the reader Ka.1, Ka.2, Bae deciphers the receiver identification on the mail item Ps.

S.1.2 is the step that the record for the receiver of this mail item Ps is determined in the receiver data memory E-Db and then the message address DVA.1, DVA.2 for this receiver is determined in this determined record.

S.1.3 is the step that the message generation facility NEE generates the inquiry message Anf-N for the mail item Ps and the message transmission facility NÜE triggers the transmission of this inquiry message Anf-N to the determined message address.

S.1.4 is the step that the registration sorting system Reg-SAnl selects a sorting terminal Ses.1, ..., Ses.4 for the mail item Ps and delivers the mail item Ps into the selected sorting terminal Ses.1, ..., Ses.4.

S.1.5 is the step that the mail item Ps is taken from the selected sorting terminal Ses.1, ..., Ses.4 and moved into a container Beh.10, ..., Beh.13 and the filled container Beh.10, ..., Beh.13 is moved to the temporary storage device RL and placed into the temporary storage device RL.

The inquiry message Anf-N additionally comprises preferably a number of possible actions which can be performed with the mail item. These possible actions include:

The mail item is delivered unchanged to an actual delivery address of the receiver ("deliver").

The mail item is opened and in each case at least one image of the content objects is generated and conveyed to the receiver ("open and scan").

The mail item is filed until the receiver has transmitted a new decision or until a predetermined period has elapsed ("store").

The mail item is destroyed in such a way that an improper restoration of the content is impossible ("safe recycling").

The inquiry message Anf-N is transmitted, as described above, to a data processing system DVA.1, DVA.2 which is specified by the message address. This data processing system DVA.1, DVA.2 is, e.g., a stationary computer or a portable data-processing device of the receiver who is specified on the mail item.

The message evaluating facility NAE evaluates incoming response messages Ant-N. The response messages arrive at the message evaluating facility NAE in random and unpredictable order. Each response message Ant-N originates from a data processing system DVA.1, DVA.2 of a registered receiver and comprises the following components:
- the internal identifier of the mail item to which the response message Ant-N refers, and
- a specification of the action which is to be performed with this mail item in accordance with the response message Ant-N.

It is possible that a single response message Ant-N refers to a number of mail items and specifies in each case an action for each of these mail items. This action can always be the same or vary from mail item to mail item.

Both the inquiry message Anf-N and the response message Ant-N are protected against falsifications and manipulations and against unauthorized access of a third party, e.g. by encryption and/or by means of electronic signature.

In one embodiment, each inquiry message Anf-N specifies the possible actions. The inquiry message Anf-N is displayed on a screen device of the data processing system DVA.1, DVA.2 of the receiver. The receiver selects a possible action by mouse click. This process triggers the steps that a response message Ant-N is generated and transmitted to the message evaluating facility NAE.

The message evaluating facility NAE evaluates each incoming response message Ant-N and determines the unambiguous identifier of the mail item to which this response message Ant-N refers, and the specified action. The message evaluating facility NAE determines the record Ds for this mail item in the mail item data memory Ps-Db and supplements this record Ds by the action which is specified in the response message Ant-N.

In one embodiment, a number of possible actions are performed on different mail items at a workstation. In another embodiment, at least one specialized workstation Bpl.1, Bpl.2, Bpl.S is provided for one possible action in each case.

In the exemplary embodiment, n execution times Ausf-T (1), . . . , Ausf-T(n) are specified. For each execution time Ausf-T(i), one execution pass Ausf-Dl(i) is performed in each case by the execution sorting system. The number n is greater than or equal to 2. For example, n=4. The execution pass Ausf-Dl(i) begins at the execution time Ausf-T(i) or within a temporal range of tolerance around this execution time Ausf-T(i). The first step of the execution pass Ausf-Dl(i) thus begins within the range of tolerance around the execution time Ausf-T(i).

In the exemplary embodiment, the first execution time Ausf-T(1) is on the first day after the delivery of the set Ps-M of mail items to the processing center of the transport service provider. The second execution time Ausf-T(2) is on the second day after the delivery, the third execution time Ausf-T(3) is on the fifth or sixth day and the fourth execution time is on the twentieth or twenty-first day after the delivery.

FIG. 2 shows diagrammatically the execution sorting system Ausf-SAnl and the further components which are used for each execution pass. In each execution pass, the steps described in the text which follows are performed. For this purpose, the execution sorting system Ausf-SAnl is used which has the following components:

the feeder Ausf-ZE of the execution sorting system Ausf-SAnl with a singulator Ausf-Ver,
a reader Lg for machine-readable identifiers of mail items, e.g. a bar code scanner, and
at least two sorting outputs, namely at least one temporary-store sorting output and at least one workstation sorting output.

This execution sorting system Ausf-SAnl can be the same as the registration sorting system Reg-SAnl which has been used in the registration sorting run, or another sorting system having a simpler structure.

In one embodiment, this execution sorting system Reg-SAnl has in each case one workstation sorting output for each possible action which can be performed with a mail item. In this embodiment, there is also in each case at least one workstation for each possible action. This makes it possible to transport the mail item directly from a workstation sorting output to its associated workstation.

All mail items which are still located in the temporary storage device RL are taken from the temporary storage device RL and supplied to the delivery facility Ausf-ZE of the execution sorting system Ausf-SAnl. This starts an execution pass.

The singulator Ausf-Ver isolates the mail items. Subsequently, the following steps are performed for each mail item which was taken out of the temporary storage device RL and supplied to the execution sorting system Ausf-SAnl:

The mail item is transported past the reader Lg for identifiers. The reader Lg deciphers the machine-readable identifier BC on the mail item. For example, the identifier printed on has the form of a bar code and the reader comprises a bar code scanner which scans and deciphers the bar code.

The execution sorting system Ausf-SAnl determines in the mail item data memory Ps-Db the record Ds for this mail item, i.e. the record having the deciphered identifier.

The execution sorting system Ausf-SAnl determines whether the determined record Ds now comprises a specification of an action which is to be performed with the mail item, or not.

If the determined Ds record comprises a specification for such an action, the mail item is delivered into a workstation sorting output. For example, the mail item is delivered into the processing sorting output which is provided for the specified action. From there, the mail item is transported to a workstation, e.g. to the workstation which is arranged for the specified action.

Otherwise, the mail item is delivered into a temporary-store sorting output. From there, the mail item is transported back into the temporary storage device RL, preferably with a container and together with many other mail items in this container.

In the example of FIG. 2, the execution sorting system Ausf-SAnl delivers each mail item which should pass back into the temporary storage device RL into the temporary-store sorting output ZwSp-Aus. The execution sorting system Ausf-SAnl delivers each mail item which should pass through the manual workstation Bpl.1 into the workstation sorting output Bpl-Aus.1. The execution sorting system Ausf-SAnl delivers each mail item which should pass to the manual workstation Bpl.2 into the workstation sorting output Bpl-Aus.2. The execution sorting system Ausf-SAnl delivers each mail item which should pass to the automatic workstation Bpl.S (shredder) into the workstation sorting output Bpl-Aus.S. The execution sorting system Ausf-SAnl thus distributes mail items to the two manual workstations Bpl.1, Bpl.2.

The mail items in the temporary-store sorting output ZwSp-Aus are transported to the temporary storage device Rl in the container Beh.5. The mail items in the temporary-store sorting output Bpl-Aus.1 are transported to the manual workstation Bpl.1 in the container Beh.6. The mail items in the workstation sorting output Bpl-Aus.2 are transported to the manual workstation Bpl.2 in the container Beh.7. The mail items in the workstation sorting output Bpl-Aus.S are transported to the automatic workstation Bpl.S in container Beh.8.

After the execution pass, a number of mail items have been transported in each case to each workstation. For this purpose, one carrier is used in each case, e.g. at least one container. In addition, the execution sorting system Ausf-SAnl has generated in each case at least one processing order Bpl-Auf for each workstation. This processing order Bpl-Auf comprises an execution record for each mail item which has been transported to the workstation.

This execution record comprises the following information about the mail item:

the unambiguous identifier BC which has been applied to the mail item,
a specification of the action which is to be performed with the mail item,
preferably the image Abb.1 of the surface of the mail item, and
preferably an identification of the position of the mail item in the carrier.

FIG. 4 illustrates the execution pass Ausf-Dl(i) for the execution time Ausf-T(i) (i=1, 2, . . . , n). In this figure:

S.2.1 is the step that the reader Lg of the execution sorting system Ausf-SAnl reads and deciphers the mail item identification BC on the mail item Ps, Ent.2.2 is the decision made by the control unit Ausf-SE whether there is a response message Ant-N for the mail item Ps or not, S.2.3 is the step that the execution sorting system Ausf-SAnl delivers the mail item Ps into the temporary-store sorting output ZwSp-Aus, S.2.4 is the step that the mail item Ps, together with the other mail items, taken from the temporary-store sorting output ZwSp-Aus and moved into the container Beh.5 and the filled container Beh.5 is moved into the temporary storage device RL, S.2.5 is the step that the execution sorting system Ausf-SAnl selects for the mail item Ps and for the action which is specified in the response message Ant-N, a sorting output Bpl-Aus.1, Bpl-Aus.2, Bpl-Aus.S which is associated with the appropriate workstation Bpl.1, Bpl.2, Bpl.S, S.2.6 is the step that the execution sorting system Ausf-SAnl delivers the mail item into the selected sorting output Bpl-Aus.1, Bpl-Aus.2, Bpl-Aus.S, S.2.7 is the step that the mail item Ps together with other mail items taken from the selected sorting output Bpl-Aus.1, Bpl-Aus.2, Bpl-Aus.S and moved into a container Beh.6, Beh.7, Beh.8 and the filled container Beh.6, Beh.7, Beh.8 is transported to the appropriate workstation Bpl.1, Bpl.2, Bpl.S, S.2.8 is the step that the specified action is performed with the mail item Ps at the appropriate workstation Bpl.1, Bpl.2, Bpl.S.

It is also possible that the mail item is moved from a sorting output Bpl-Aus.1, Bpl-Aus.2, Bpl-Aus.S by means of a conveyor, e.g. a sequence of endless conveyor belts, to the respective workstation Bpl.1, Bpl.2, Bpl.S. Such a conveyor can also transport the mail items from the temporary-store sorting output ZwSp-Aus to the temporary storage device RL.

Each manual workstation Bpl.1, Bpl.2 comprises preferably a stationary video display unit Bpl-Bg.1, Bpl-Bg.2. On the video display unit Bpl-Bg.1, Bpl-Bg.2, the processing order Bpl-Auf for the workstation Bpl.1, Bpl.2 is represented. For example, an execution record for a mail item is in each case represented. An operator looks for the specified mail item in the carrier, takes the mail item out of the carrier and carries out the specified action. It is also possible that an automatic handling device performs the removal and/or the actions. It is also possible that the mail item is transported to the manual workstation in a holder.

If the mail item is to be sent unopened to an actual delivery address, the mail item is placed into a hitherto empty envelope in one embodiment. This envelope is provided with an identification of the actual delivery address and subjected to the usual sorting. This hitherto empty envelope is preferably also provided with an unambiguous identifier and the record Ds for the mail item is supplemented by this additional unambiguous identifier. A sorting system triggers the transportation of the mail item in the new envelope to the actual delivery address of the receiver during the usual sorting.

In another embodiment, a label which identifies the actual delivery address is glued over a receiver identification which is specific for the registered receiver. The mail item with the label is also subjected to the normal sorting.

If the mail item is to be filed or destroyed, the specified action is performed. If destruction is specified, the mail item is destroyed physically, for example.

If the receiver has specified the action "open and scan", the following steps are performed:

The mail item is opened by means of the device for opening.

The content objects are taken from the opened mail item.

The scanner at the manual workstation generates at least one image in each case of each content object in the opened mail item.

If the content object is a sheet, an image is generated of each side of the sheet in each case.

The record Ds for this mail item in the mail item data memory Ps-Db is supplemented by the images of the content objects.

The packaging element (the envelope in the case of a letter) and the content objects are moved into a new packaging element.

A new unambiguous identifier is generated. This new identifier is applied to the new packaging element.

The record Ds for this mail item is supplemented by the new identifier.

The new packaging element is closed.

The closed new packaging element is moved into the temporary storage device RL.

The message generation facility NAE generates a second inquiry message. This second inquiry message comprises the (first) unambiguous identifier of the mail item and the images of the content objects.

The message transmission facility NÜE transmits this second inquiry message to a message address of the registered receiver exactly as happened with the first inquiry message Anf-N.

This concludes the steps which are to be performed when the receiver has specified the action "open and scan". The message evaluation facility NAE checks whether a second response message has been received for this mail item or not.

A second response message to this second inquiry message specifies one of the following possible actions:

delivering the mail item in the new packaging element to the actual delivery address, or to file the mail item or to now destroy the mail item.

The option "open and scan" is now no longer appropriate and is not offered.

The steps described above are performed in each execution pass Ausf-Dl(1), . . . , Ausf-Dl(n). After the last execution pass Ausf-Dl(n), the mail items for which no response message Ant-N has been transmitted to the message evaluation facility NAE up to the last execution time Ausf-T(n) have been transported back into the temporary storage device RL. In addition, the mail items for which the response message has specified "open and scan" and for which no second response message has reached the message evaluation facility NAE up to the last execution time Ausf-T(n) are located in the temporary storage device RL.

The execution sorting system Ausf-SAnl preferably determines additionally the order in which it has delivered mail items into the temporary-store sorting output ZwSp-Aus in the last execution pass Ausf-Dl(n). The identifier of the container or the identifiers of those containers in which this mail item has been moved are also determined. The record Ds for the mail item is supplemented by the identifier of the container and by an identifying position at which this mail item is located in the container. The record is also supplemented preferably by an identifier of the storage position in which this container has been placed. This facilitates recovery of the mail items in the temporary storage device RL during the storage period Aufb-ZR.

A storage period Aufb-ZR is specified for the mail items which are still in the temporary storage device RL after the last execution pass. After the end of the storage period Aufb-ZR, all mail items of the set of mail items Ps-M are taken from the temporary storage device RL.

In a preferred embodiment, a terminating pass is performed. During this pass, the following steps are performed for each mail item from the temporary storage device RL:

The unambiguous identifier on the mail item is deciphered. The record for this mail item is determined.

If the record for this mail item specifies a standard action, this standard action is carried out with the mail item. This standard action only applies to the case where no response message Ant-N specifies a special action for the mail item.

Otherwise, a predetermined universal action is performed. For example, the mail item is safely destroyed.

In one embodiment, an individual execution is performed, if necessary, with at least one single mail item from the temporary storage device within the storage period Aufb-ZR. In one embodiment, an individual execution is triggered in that, after the last execution pass Ausf-Dl(n), a response message has been transmitted to the message evaluation facility NAE and this response message Ant-N relates to a mail item which is still in the temporary storage device RL after the last execution pass Ausf-Dl(n). The message evaluation facility NAE evaluates the response message Ant-N and determines the unambiguous identifier in this response message and the action in which a response message Ant-N is specified.

In another embodiment, m successive test times Prüf-T(1), . . . , Prüf-T(m) are predetermined which are all in the storage period Aufb-ZR. For example, the storage period Aufb-ZR begins with the first test time Prüf-T(1) and ends with the last test time Prüf-T(m). At each test time Prüf-T(j), it is determined which response messages have arrived since the preceding test time Prüf-T(j-1) (j=2, 3, . . . , m). At the first test time Prüf-T(1), it is determined which response messages have arrived since the last execution time Ausf-T(n).

For each response message Ant-N which arrives within the storage period Aufb-ZR, and for the mail item Ps which is specified in this response message Ant-N, the following steps are performed:

The mail item Ps is searched for in the temporary storage device RL. For this purpose, the identifier of the container and the identification of the position in the container and, in one embodiment, the identifier of the storage position of the container are used for searching for the mail item Ps.

If the mail item which is named in the response message Ant-N is found in the temporary storage device RL, the mail item found is taken from the temporary storage device RL. All other mail items remain in the temporary storage device RL.

The action specified is performed with the removed mail item Ps.

FIG. 5 shows an individual execution Ind-Ausf(j) for the test time Prüf-T(j). In FIG. 5, S.3.1 is the step that the message evaluation facility NAE evaluates all response messages which have arrived after the preceding test time Prüf-T(j-1) (j>1) or after the last execution time Ausf-T(n) (j=1) and therefore relate to in each case one mail item which is still located in the temporary storage device RL.

S.3.2 is the step that it is determined for a response message Ant-N to which mail item Ps this response message Ant-N relates, and that this mail item Ps is looked for in the temporary storage device RL and taken from the temporary storage device RL, and S.3.3 is the step that the action is determined which is specified in the response message Ant-N and the mail item Ps is transported to an appropriate workstation.

Referring now to FIG. 6 there is shown, by way of example, the steps of FIGS. 3, 4, and 5 along a time axis. In the example of FIG. 6, n=2. At the first execution time Ausf-T(1), a first execution pass Ausf-Dl(1) is performed, at the second and at the same time last execution time Ausf-T(2), a second execution pass Ausf-Dl(2) is performed. At the m=3 predetermined test times Prüf-T(1), Prüf-T(2), Prüf-T(3), the three individual executions Ind-Ausf(1), Ind-Ausf(2) and Ind-Ausf(3) are performed.

In the embodiment described until now, the execution passes Ausf-Dl(1), . . . , Ausf-Dl(n) are performed before the storage period Aufb-ZR. In another embodiment, the execution passes Ausf-Dl(1), . . . , Ausf-Dl(n) are performed after the storage period Aufb-ZR. This embodiment is appropriate particularly when there is a risk that an execution pass could confirm an object, that is to say a mail item in this case. The inquiry message Anf-N for an object preferably additionally names the first execution time Ausf-T(1) and describes, therefore, when the first execution pass Ausf-Dl(1) begins. Or the inquiry message names another last time possible by which a response message must be present so that the object can still be dealt with before the first execution pass Ausf-Dl(1) and is not subjected to an execution pass. It is up to the receiver of the inquiry message Anf-N to send the response message Ant-N for this object at such an early time that the response message Ant-N arrives in time before the first execution pass Ausf-Dl(1) so that the object is still dealt with by an individual execution and/or an execution pass. It is also possible to check automatically already during the registration sorting run Reg-Sl whether an object could be damaged by an execution pass, and if so, to insert a corresponding reference into the inquiry message.

In a development of this embodiment, two storage periods are predetermined. A first storage period is before the execution time Ausf-T(1), . . . , Ausf-T(n). A second storage period is after the last execution time Ausf-T(n). It is also possible to perform an execution pass Ausf-Dl(1) initially, then to leave the objects in the temporary storage device during a first storage period and to remove an object only on the basis of an individual execution, and then to perform at least one further execution pass Ausf-Dl(2) and then to leave the remaining objects in the temporary storage device during a second storage period.

The invention claimed is:

1. A method for processing a plurality of objects, wherein each of the objects is provided with a respective identification, wherein a sequence is predetermined with an execution time or a number of successive execution times, and wherein at least one maximum storage period is predetermined, the method which comprises:

passing all objects to be processed through a registration sorting system in a registration sorting run, and performing the following steps in the registration sorting run for each object to be processed:
acquiring with the registration sorting system the identification on the object;
generating an inquiry message, the inquiry message including at least one information item about the object;
determining a message address in dependence on the identification on the object;
transmitting the inquiry message to the message address;
delivering the object from the registration sorting system into a temporary storage device;
at each execution time, triggering a process sequence and subjecting all of the objects located in the temporary storage device at execution time to the following steps:
taking the object from the temporary storage device;
passing the object through an execution sorting system in an execution pass;

identifying each object with the execution sorting system in the execution pass, the removal of which from the temporary storage device was triggered at the execution time and which passes through the execution sorting system; and wherein each execution pass for each identified object includes the following steps:

checking whether or not a response message has arrived for the respective object;

thereby using as the response message for the object an incoming message that refers to the object and specifies an action that is to be performed with the object;

if a presence of a response message for the object is found, triggering the following steps:

transporting the respective object to a workstation; and performing at the workstation the action that is specified in the response message for the object;

otherwise, delivering the object with the execution sorting system and moving the object back into the temporary storage device; and if a response message that refers to an object in the temporary storage device and specifies an action to be performed with the object arrives during the storage period, taking the object from the temporary storage device; and triggering a performance of the action specified in the response message.

2. The method according to claim 1, wherein each predetermined execution time lies before the storage period in time and each execution pass is performed before the storage period.

3. The method according to claim 1, wherein:

each execution pass is performed after the storage period; and at least one inquiry message for an object comprises an identification of a first execution time.

4. The method according to claim 1, which comprises:

when a response message is present for an object, triggering at least one of the following steps specified in the response message:

transporting the object to a destination that is specified by the determined object identification on the object;

destroying the object; and generating a further information item about the object and transmitting the further information item as a further inquiry message to a further message address; wherein the further message address is specified in the response message for the respective object or is equal to the message address determined therefor.

5. The method according to claim 4, wherein:

each object comprises a packaging element and at least one content object;

each content object of an object is located in the packaging element before the beginning of processing; and the step of generating the further information about the object, in reaction to a response message, comprises the following steps:

taking each content object from the packaging element;

generating in each case at least one computer-provided image of each content object thus removed;

moving each content object into a further packaging element so that, subsequently, all content objects are located in at least one further packaging element;

moving each further packaging element back into the temporary storage device; and transmitting the at least one image per content object to the further message address as a component of the further inquiry message.

6. The method according to claim 1, wherein the execution sorting system, in an execution pass, performs the following:

delivering an object into a workstation sorting output of the execution sorting system when a response message has arrived for the object; and otherwise delivering the object into a temporary-store sorting output of the execution sorting system;

moving all objects out of the temporary-store sorting output into the temporary storage device; and transporting all objects out of each workstation sorting output to in each case one workstation where the specified actions are performed.

7. The method according to claim 1, which comprises predetermining at least one test time, each predetermined test time lying in the storage period, and at each test time, triggering the performance of the following steps:

determining which response messages to be processed have arrived;

wherein a response message to be processed is such a response message which has arrived after the last execution time and which refers to an object which is still located in the temporary storage device; and for each response message to be processed, performing the following steps:

taking the object, to which this response message refers, from the temporary storage device; and triggering a performance of the actions specified in the response message.

8. The method according to claim 1, which comprises:

using a plurality of temporary storage devices;

after the execution pass, for an execution time, selecting such a temporary storage device that can accommodate all objects, which have passed through the execution sorting system in the execution pass and for which the test shows that no response message is present; and moving these objects into the selected temporary storage device.

9. The method according to claim 1, which comprises predetermining at least three execution times such that a time interval between the first execution time and the second execution time is less than a time interval between the second execution time) and the third execution time.

10. The method according to claim 1, which comprises:

using a plurality of workstations;

providing the execution sorting system with a plurality of sorting outputs each allocated to one of the workstations;

in each execution pass, when a response message which specifies an action has arrived for an object, selecting a workstation in dependence on the action; and delivering the object into the sorting output that is allocated to the selected workstation.

11. A device for processing a multiplicity of objects, wherein each of the objects is provided with a respective identification, the device comprising:

a times data memory, said times data memory having specified therein an execution time or a sequence of a number of successive execution times and a maximum storage period;

a temporary storage device;

an execution sorting system;

a registration sorting system arranged so that all objects pass through said registration sorting system;
at least one workstation;
a message generation facility;
a message transmission facility; and
a message evaluation facility;
wherein the device is configured for performing the following process steps for each object passing therethrough:
acquiring with the registration sorting system, by deciphering or determining in another way, the identification on the object;
generating with the message generation facility an inquiry message, the inquiry message including at least one information item about the object;
determining with the message generation facility a message address in dependence on the object identifications determined;
triggering with the message transmission facility a transmission of the inquiry message to the message address thus determined; and
moving the object into the temporary storage device;
wherein the device is further configured to trigger at each execution time the following process steps:
taking all objects which are located in the temporary storage device at the execution time from the temporary storage device; and
passing the objects thus removed through the execution sorting system in an execution sorting run for the execution time;
wherein said execution sorting system is configured for identifying, in the execution pass, each object, the removal of which from the temporary storage device was triggered at this execution time and which passes through the execution sorting system;
wherein the device is further configured for performing, in each execution pass, for each identified object, the following steps:
checking with the message evaluation facility whether a response message has arrived for the given object;
using an incoming message which refers to the given object and specifies an action which is to be performed with the given object as response message for the object;
if the message evaluation facility finds that a response message is present for the given object:
transporting the object to a workstation of the device; and
performing the action on the object which is specified in the response message;
otherwise delivering the given object from the execution sorting system and moving the object back into the temporary storage device; and
wherein the device is further configured for, when a response message which refers to an object in the temporary storage device and specifies an action, arrives in the device within the storage period:
taking the object from the temporary storage device; and
causing a transport of the object to a workstation of the device and performing the action on the object which is specified in the response message.

* * * * *